Jan. 13, 1942.        S. F. COLE        2,269,648
VISCOMETER
Filed Oct. 25, 1937
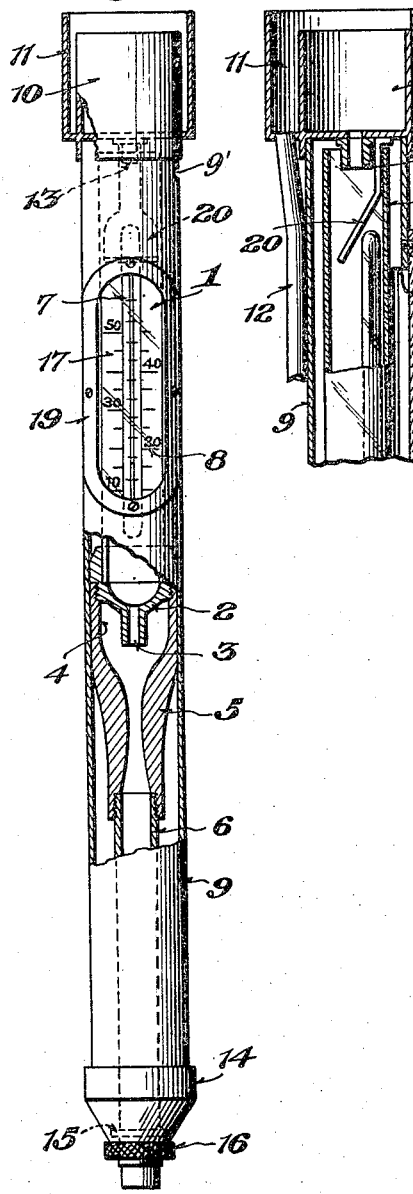
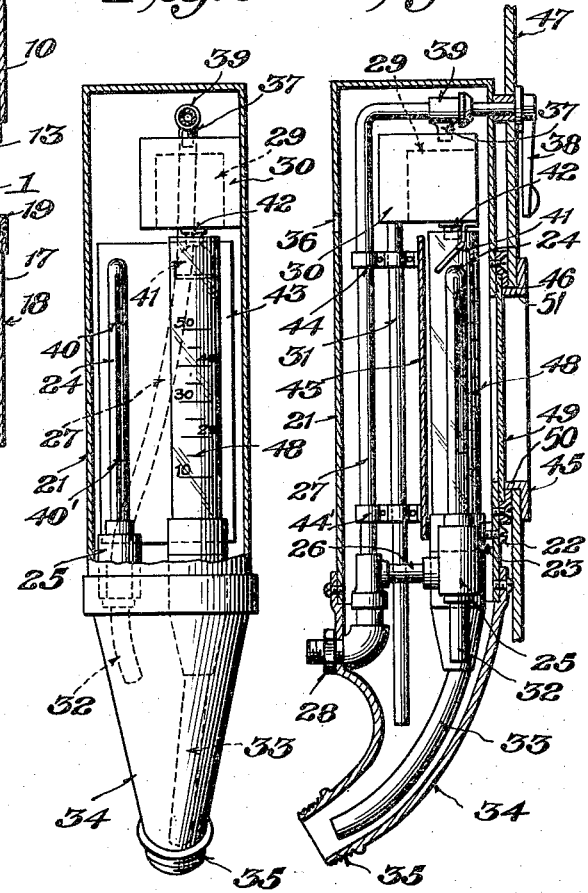
Inventor
Samuel F. Cole Patented Jan. 13, 1942

2,269,648

UNITED STATES PATENT OFFICE 2,269,648

VISCOMETER

Samuel F. Cole, Washington, D. C.

Application October 25, 1937, Serial No. 170,947

5 Claims. (Cl. 265—11)

This invention relates to means for measuring the viscosity of liquids and is an improvement over the device disclosed in my prior application Number 630,736, filed August 27, 1932, now Patent #2,097,388 for "Method and means for measuring the viscosity of fluids."

The objects of the present invention are to simplify the construction and improve the operation of a device of this character; to reduce the cost of manufacture; to facilitate the fabrication of a unitary device; and to provide a constantly effective temperature indicating means, and an optionally effective supply means, in combination with a device for measuring the aspirating value of liquids in terms of viscosity.

With these and other objects in view, this invention consists essentially in a means for supplying the liquid under test at a constant head to a measuring vessel which terminates in a single discharge member through which the liquid passes into an attached aspirating means adapted to vary the level of the liquid in the measuring vessel in accordance to the rate of flow. The invention further consists in providing a device of the above character with means for constantly indicating the temperature of a circulating liquid, and with means for optionally controlling the flow of the liquid through the metering assembly.

This invention will be readily apparent to those skilled in the art from the following specification considered in connection with the accompanying drawing in which:

Figure 1 is a front elevation partly in section;

Figure 2 is a fragmentary side view in section of the upper portion of Figure 1;

Figure 3 is a front elevation partly in section of a modification; and

Figure 4 is a side elevation of Figure 3 partly in section.

In the drawing, the numeral 1 denotes a transparent tubular measuring chamber to the lower end of which is attached the closure member 2. The numeral 3 indicates an efflux nozzle which may be integral with the closure member 2 as shown in the drawing. This nozzle is concentric with the longitudinal axis of chamber 1. An air chamber 4 is attached to the closure member 2 and incloses the nozzle 3. This air chamber terminates in the elongated constricted conduit 5 the lower end of which is enlarged in diameter to correspond with the diameter of the attached discharge conduit 6. The numeral 7 indicates a thermometer which is attached within chamber 1 adjacent to the viscosity scale 8 inscribed on chamber 1.

The above assembly constitutes a viscometer of ultimate simplicity which is adapted for installation in a wide variety of casings for use under diverse conditions. The modification shown in Figure 1 is adapted for use as a portable laboratory instrument. This embodiment includes the protective insulating casing 9 on the upper end of which is demountably supported the constant level chamber 10 which is surrounded by the overflow chamber 11. The overflow chamber 11 is provided with the overflow conduit 12 which may conveniently discharge in proximity to the lower end of the discharge conduit 6, but under conditions which will prevent any modification of the predetermined value of the conduit 6. The constant level chamber 10 is provided with the discharge member 13 which is adapted to supply liquid to chamber 1 in excess of the discharge rate of nozzle 3. This excess produces an accumulation of liquid in chamber 1 resulting in a liquid column therein. The height of this liquid column will be varied in response to the aspirating effect produced by the joint action of the constricted conduit 5 and the discharge conduit 6 upon the air contained in the air chamber 4.

During the operation of this device, the action of the aspirating means disturbs the initial pressure equilibrium within the device, whereupon the atmospheric pressure upon the surface of the liquid column, in combination with the hydrostatic pressure of the liquid column, tends to restore a state of equilibrium by increasing the discharge rate of nozzle 3. This increase in discharge is accompanied by the lowering of the liquid level in chamber 1 which compensates for the pressure reduction effected by the aspirating means, and restores a state of equilibrium within the device. The pressure reduction in the air chamber 4 varies with the rate of flow of the liquid under test—slowly flowing viscous liquids producing relatively less pressure reduction than more rapidly flowing, less viscous liquids. Thus, the minimum pressure reduction produced by liquids of maximum viscosity act upon the least responsive liquids to produce a minimum increase in flow, whereas the maximum pressure reduction induced by liquids of minimum viscosity act with maximum effect on the most responsive liquids and effect the maximum increase in flow. Obviously, an increase in the discharge from nozzle 3, unaccompanied by a corresponding increase in the input from the discharge member 13, will produce a variation in (lowering of) the initial head in chamber 1. Therefore, liquids of maximum viscosity will produce a maximum liquid column in chamber 1. The height of this column will be reduced in response to reduction in the viscosity of the liquid. The liquid level in chamber 1 is therefore indicative of the viscosity of a liquid under test.

Casing 9 is provided with the vent 9' adjacent to the constant level chamber 10, and with the closure member 14. Member 14 is attached to casing 9 in any suitable manner, and the entire casing is firmly clamped in place on the metering assembly by the knurled nut 16 which forces the member 14 into binding contact with the annular boss 15 on the lower end of the discharge conduit 6. Casing 9 is also provided with the longitudinal aperture 17 which is closed by the transparent member 18. Member 18 is retained in position by the rabbeted frame 19 which is attached to casing 9. Attached to the under side of the constant level chamber 10 is the baffle 20 which depends into chamber 1 and intercepts the liquid discharged thereinto. The purpose of this baffle is to divert the incoming liquid from the face of chamber 1, and to prevent turbulence in the liquid column.

While the drawing depicts a threaded engagement between closure member 2 and air chamber 4, and between the constricted conduit 5 and the discharge 6, these members may be formed of lighter material as a unitary member by any approved process, such as soldering or welding the several parts, or by forming the members of a single tube and inserting the nozzle 3. Similarly, the discharge member 13 may be formed integral with the constant level chamber 10. When desired, the entire apparatus may be fabricated of glass or a suitable plastic material. With these materials, chamber 1, closure 2, nozzle 3, air chamber 4, constricted conduit 5, and discharge conduit 6 may be integral members, while chambers 10 and 11, overflow conduit 12, discharge member 13, and baffle 20 may also be integral members. A suitably modified casing 9 could be integral with the first mentioned integral members, and either evacuated or adapted for the circulation of a constant temperature liquid as a bath.

Figures 3 and 4 disclose a modification of the foregoing structure which is especially adapted for connection to a circulating liquid system such, for example, as the lubricating system of an automobile. The viscometer assembly is supported within casing 21 by screw 22 which passes through the front wall of casing 21 into the boss 23 attached to the viscometer assembly. The thermometer 24 is supported with its bulb confined in the temperature chamber 25, said chamber being connected to the by-pass 26 which communicates with the supply conduit 27. Conduit 27 passes through the rear wall of casing 21, and is attached thereto by the clamping member 28. The supply conduit 27 extends to the constant level chamber 29. The overflow from chamber 29 is discharged from the overflow chamber 30 through the overflow conduit 31. Thermometer chamber 25 is provided with the discharge tube 32, which like the overflow conduit 31 and the discharge conduit 33, discharges into the tapering angular lower member 34 of casing 21. The threaded lower end 35 of member 34 is adapted for connection to the return line of the circulating system. Casing 21 is provided with the vent 36. The upper end of supply conduit 27 is provided with the discharge member 37 which is adapted for control by the lever 38 which operates a suitable valve 39. The object of this valve is to prevent the circulation of liquid at temperatures other than those for which the device is designed. When the thermometer 24 indicates a temperature within the zone indicated by the graduations 40 and 40', the valve 39 may be opened as the temperature will be within the range of the apparatus. A suitable baffle 41 is attached the under side of the constant level chamber 29 and depends into transparent viscosity measuring chamber 48 to intercept the liquid discharged from the orifice 42 in the constant level chamber 29. The numeral 43 indicates an opaque screen which is supported on the overflow conduit 31 by the clamping members 44 and 44'. These clamping members also support the constant level assembly on the supply conduit 27. This screen may be utilized as a dial by inscribing thereon appropriate temperature and viscosity indicia. A suitable bezel 45 frames the aperture 46 in the instrument board 47, and permits a view of the indicating devices through the transparent member 49 which is attached to casing 21 over the aperture 50 in the front wall thereof by the rabbeted frame 51.

The operation of this device is as follows:

The liquid under test is supplied at a constant head to the measuring chamber from which it is discharged at a rate sufficiently less than the input to create a liquid column in the measuring chamber. From the measuring chamber, the liquid is discharged into an aspirating means which reduces the initial head in the measuring chamber in accordance with the viscosity of the liquid as hereinbefore described. Upon entering the measuring chamber, the liquid encounters a baffle which distributes it away from the face of the measuring chamber and prevents turbulence in the liquid column. The viscometer assembly is insulated by a suitable casing. This casing may be adapted to maintain a constant temperature or may be evacuated to secure more complete insulation. The overflow from the constant level chamber, and the discharge from the aspirating means are discharged under conditions which induce no variation into the predetermined effect of the aspirating means. When applied to a circulating liquid system, connections are made to the supply and return lines of the system. A by-pass leads from the supply conduit to a temperature indicating chamber which is independent of the viscometer assembly. The bulb of a thermometer is confined within the temperature indicating chamber and is thus constantly responsive to the temperature of the circulating liquid. A suitable valve is provided to permit the optional admission of liquid into the viscometer. By this means the circulation of the liquid may be limited to a predetermined temperature range as indicated by the thermometer. This prevents the retardation of flow which would result if liquids of lower temperatures than contemplated were admitted into the viscometer assembly. The thermometer is provided with graduations defining the temperature range for which a given instrument is calibrated, while the measuring chamber is provided with indicia showing the range of the viscosities covered. This indicia need not be in units of viscosity, but may depict a safe viscosity zone.

Having thus described my invention, I claim:

1. A viscometer comprising in combination a constant level supply chamber a plurality of concentric tubular members including a transparent upper member communicating with the supply chamber, a constricted intermediate member, and an elongated lower member, the said upper member being provided with a single orificed closure in the lower end thereof and with means to prevent the turbulent flow of liquid therein, and the intermediate member having flared ends corresponding to the diameter of the upper and lower members.

2. A viscometer comprising in combination a constant level supply chamber, a transparent measuring chamber communication with the supply chamber, a single efflux nozzle in the lower end of the measuring chamber, means to prevent turbulence within the measuring chamber, a Venturi member integral with the measuring chamber and inclosing the efflux nozzle, a discharge conduit integral with the Venturi member, the said chambers, Venturi member, and discharge conduit being connected in longitudinal alinement.

3. A viscometer comprising in combination a plurality of tubular members including a constant level supply chamber, an aspirating means provided with a single inlet and a single outlet, a transparent measuring chamber mounted on the upper end of the aspirating means and communicating with the supply chamber and the aspirating means, and a discharge member attached to the lower end of the aspirating means, the measuring chamber being provided with a discharge outlet inclosed within the aspirating means.

4. A viscometer comprising in combination a constant level supply chamber, a graduated transparent measuring chamber communicating with the supply chamber, baffle means within the measuring chamber to prevent the turbulent inflow of liquid, a closure member having an orifice and provided with an annular seat for the lower end of the measuring chamber, a constricted throat member with flared upper and lower end portions, the upper end of the throat member being in threaded engagement with the closure member and providing a chamber inclosing the orifice of the closure member, an elongated discharge conduit attached to the lower end of the throat member, and a windowed casing inclosing the said members.

5. A viscometer comprising in combination a constant level supply means, means communicating with the constant level supply means for connecting to a circulating liquid system, a constricted throat member terminating in flared end portions, a graduated transparent measuring chamber communicating with the supply means and with the throat member, means within the measuring chamber to prevent turbulence in the liquid within the said chamber, a closure member for the lower end of the measuring chamber provided with an efflux orifice confined within the upper end of the throat member, an elongated discharge conduit attached to the lower end of the throat member, means responsive to the temperature of the liquid under test to indicate the operating range of the apparatus, optionally effective means for controlling the liquid supply to the constant level supply means, said optionally effective means being connected to the connecting means and a detachable windowed casing for the assembled members.

SAMUEL F. COLE.